(12) United States Patent
Wang et al.

(10) Patent No.: US 10,728,530 B2
(45) Date of Patent: Jul. 28, 2020

(54) THREE-DIMENSIONAL DISPLAY DEVICE WITH SUB-LIGHT SOURCE AND CORRESPONDING BLAZED GRATING AND DISPLAY METHOD THEREOF

(71) Applicant: BOE TECHNOLOGY GROUP CO., LTD., Beijing (CN)

(72) Inventors: Qian Wang, Beijing (CN); Xiaochuan Chen, Beijing (CN); Wenqing Zhao, Beijing (CN); Chen Yu Chen, Beijing (CN); Jinye Zhu, Beijing (CN); Zhongxiao Li, Beijing (CN); Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 101 days.

(21) Appl. No.: 15/919,347

(22) Filed: Mar. 13, 2018

(65) Prior Publication Data

US 2019/0089948 A1 Mar. 21, 2019

(30) Foreign Application Priority Data

Sep. 21, 2017 (CN) .......................... 2017 1 0861040

(51) Int. Cl.
*H04N 13/31* (2018.01)
*H04N 13/32* (2018.01)
(Continued)

(52) U.S. Cl.
CPC ............. *H04N 13/31* (2018.05); *G02B 30/26* (2020.01); *G02B 30/27* (2020.01); *H04N 13/32* (2018.05); *H04N 13/398* (2018.05)

(58) Field of Classification Search
CPC .. G02B 27/2214; G02B 27/225; H04N 13/31; H04N 13/32; H04N 13/398
See application file for complete search history.

(56) References Cited

U.S. PATENT DOCUMENTS

| 2014/0233100 A1* | 8/2014 | Sato | G02B 30/27 359/463 |
| 2015/0109549 A1* | 4/2015 | Gong | G02B 27/2214 349/15 |

(Continued)

FOREIGN PATENT DOCUMENTS

| CN | 103760677 A | 4/2014 |
| CN | 105676474 A | 6/2016 |

OTHER PUBLICATIONS

First Office Action for Chinese Patent Application No. 201710861040.9 dated Aug. 27, 2019.

*Primary Examiner* — Jessica M Prince
(74) *Attorney, Agent, or Firm* — Calfee, Halter & Griswold LLP (57) ABSTRACT

The present disclosure provides a three-dimensional display device and a display method thereof. The three-dimensional display device includes a display panel including a plurality of first display units and a plurality of second display units; a plurality of light emitting unit groups disposed on one side of the display panel, wherein each of the light emitting unit groups includes a plurality of first light emitting units respectively corresponding to the first display units, and a plurality of second light emitting units respectively corresponding to the second display units; and a control unit configured to control the first light emitting units and the second light emitting units in a light emitting unit group corresponding to a target position to emit lights so that the first light emitting units and the second light emitting units emit lights along a direction pointed to the target position.

7 Claims, 3 Drawing Sheets

(51) Int. Cl.
    *H04N 13/398*     (2018.01)
    *G02B 30/26*     (2020.01)
    *G02B 30/27*     (2020.01)

(56) References Cited

U.S. PATENT DOCUMENTS

| | | | |
|---|---|---|---|
| 2015/0228702 A1* | 8/2015 | Lee | G09G 3/3611 257/40 |
| 2015/0378167 A1* | 12/2015 | Oka | H04N 13/315 349/15 |
| 2016/0191906 A1* | 6/2016 | Song | H04N 13/31 348/51 |
| 2016/0205389 A1* | 7/2016 | Meng | H04N 13/31 348/54 |
| 2017/0155894 A1* | 6/2017 | Lee | G03H 1/2294 |
| 2018/0011237 A1* | 1/2018 | Fattal | G02B 5/18 |
| 2019/0011718 A1* | 1/2019 | Roelen | G02B 27/2214 |
| 2019/0111718 A1* | 4/2019 | Kasahara | B41M 3/06 |

* cited by examiner

THREE-DIMENSIONAL DISPLAY DEVICE WITH SUB-LIGHT SOURCE AND CORRESPONDING BLAZED GRATING AND DISPLAY METHOD THEREOF

CROSS-REFERENCE TO RELATED APPLICATIONS

This application is based on and claim priority to Chinese Patent Application No. 201710861040.9, filed on Sep. 21, 2017, the entire contents thereof are incorporated herein by reference.

TECHNICAL FIELD

The disclosure relates to the technical field of display, and in particular, to a three-dimensional display device and a display method thereof.

BACKGROUND

At present, with the continuous development of liquid crystal display technology, three-dimensional (three-dimensional) display technology has attracted more and more attention. The three-dimensional display technology can make a picture become three-dimensional realistic. The basic principle of the three-dimensional display is that the left eye and the right eye respectively receives different pictures, and then the brain superimposes the pictures to regenerate a picture and constitute an image of three-dimensional effect.

At present, the three-dimensional display technology is mainly divided into two implementations: a naked-eye type and a glasses type. For the glasses-type three-dimensional display technology, the user needs to wear special glasses and may feel inconvenient to carry the special glasses. Therefore, more attention has been paid to the development of the naked-eye type three-dimensional display. The current implementation of the naked-eye type three-dimensional display mainly includes two types: barrier gratings and optical lenses.

However, with the current three-dimensional display device implemented by the barrier gratings or the optical lenses, only part of the light emitted by the display device is received by human eyes, and most of the light does not fall into human eyes, resulting in serious waste of power.

SUMMARY

Embodiments of the present disclosure provide a three-dimensional display device and a display method thereof, to solve the problem of serious waste of power of the three-dimensional display device existing in the related art.

An embodiment of the present disclosure provides a three-dimensional display device, including:

a display panel including a plurality of first display units and a plurality of second display units;

a plurality of light emitting unit groups, disposed on one side of the display panel; wherein each of the light emitting unit groups includes a plurality of first light emitting units respectively corresponding to the first display units, and a plurality of second light emitting units respectively corresponding to the second display units; and a control unit configured to control the first light emitting units and the second light emitting units in a light emitting unit group corresponding to a target position to emit lights so that the first light emitting units and the second light emitting units emit lights along a direction pointed to the target position.

In one possible implementation, in the above three-dimensional display device provided by the embodiment of the present disclosure, the control unit includes a transmission grating disposed on a light emitting side of the light emitting unit group; and the transmission grating is configured to change the light emitting directions of the light emitting units.

In one possible implementation, in the above three-dimensional display device provided by the embodiment of the present disclosure, the first light emitting unit and the second light emitting unit are strip-shaped light sources formed by a plurality of sub-light sources.

In one possible implementation, in the above three-dimensional display device provided by the embodiment of the present disclosure, the transmission grating is a blazed grating;

the blazed grating includes a grating surface and a groove surface; and the grating surface is parallel to the light emitting surface of the light source, and the groove surface forms an angle with the grating surface, and the angle is a blaze angle.

In one possible implementation, in the above three-dimensional display device provided by the embodiment of the present disclosure, each of the sub-light sources in the light source is a white light source; and for the blazed gratings corresponding to the same light source, the blaze angles are the same.

In one possible implementation, in the above three-dimensional display device provided by the embodiment of the present disclosure, the light source includes sub-light sources of at least three colors;

for the blazed gratings corresponding to the same light source, the blaze angles of the blazed gratings corresponding to the sub-light sources of the same color are the same.

In one possible implementation, in the above three-dimensional display device provided by the embodiment of the present disclosure, for the blazed gratings corresponding to the same light source, the larger the wavelength of the light emitted from sub-light source, the smaller the blaze angle of the blazed grating corresponding to the sub-light source will be.

In one possible implementation, in the above three-dimensional display device provided by the embodiment of the present disclosure, the wavelength of the emitted light of the sub-light source and the blaze angle satisfy the relationship:

$$m\lambda = 2d \cdot \sin \alpha \cdot \cos \theta_0$$

where $\lambda$ represents the wavelength of the light emitted by the sub-light source, d represents the grating period of the blazed grating, $\alpha$ represents the angle between the emitted light of the sub-light source and the normal of the groove surface, $\theta_0$ represents the blaze angle, and m represents a natural number.

In one possible implementation, in the above three-dimensional display device provided by the embodiment of the present disclosure, a number of pixel columns corresponding to the first display unit is the same as a number of pixel columns corresponding to the second display unit.

In one possible implementation, the above three-dimensional display device provided by the embodiment of the present disclosure further includes: a human-eye positioning unit;

wherein the human-eye positioning unit is configured to determine a position of human eyes, determine the position of the human eyes as the target position, and send the position information of the target position to the control unit.

An embodiment of the present disclosure provides a display method of the above three-dimensional display device, including:

determining a target position; and according to the target position, controlling the first light emitting units and the second light emitting units in the light emitting unit group corresponding to the target position to emit lights so that the first light emitting units and the second light emitting units emit lights in a direction toward the target position.

In one possible implementation, in the above display method provided by the embodiment of the present disclosure, the first light emitting unit and the second light emitting unit are strip-shaped light sources formed by a plurality of sub-light sources; and according to the target position, controlling the first light emitting units and the second light emitting units in the light emitting unit group corresponding to the target position to emit lights includes:

according to the target position, turning on the light sources in the light emitting unit group corresponding to the target position.

DETAILED DESCRIPTION

In view of the problem of serious waste of power of the three-dimensional display device existing in the related art, an embodiment of the present disclosure provides a three-dimensional display device and a display method thereof.

The specific embodiments of the three-dimensional display device and the display method provided in the embodiments of the present disclosure are described in detail below with reference to the accompanying drawings. The size and shape of each structure in the drawings do not reflect the true scale, and are only intended to illustrate the present disclosure.

Figure 1A:
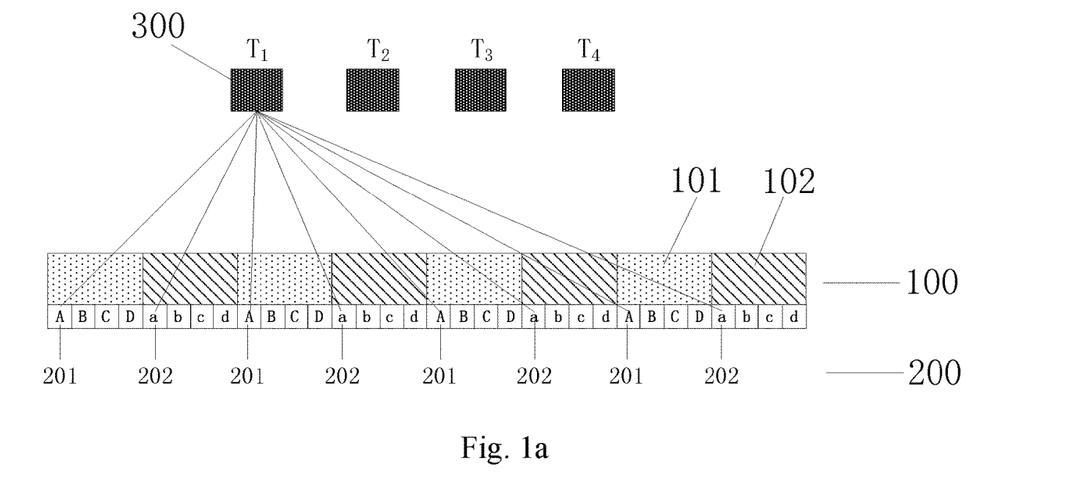
FIG. 1a is a first schematic structural diagram of a three-dimensional display device according to an embodiment of the present disclosure.
Figure 1B:
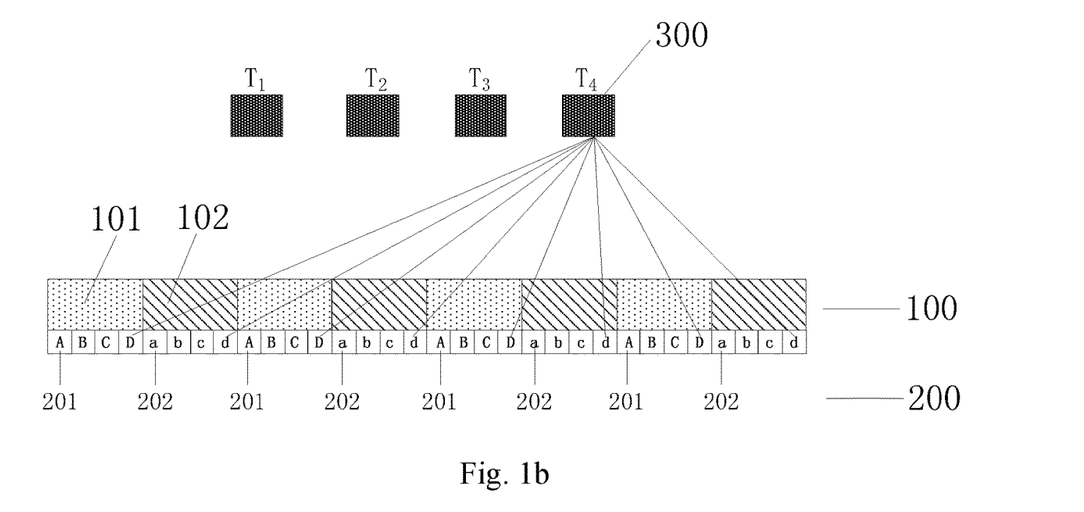
FIG. 1b is a second schematic structural diagram of a three-dimensional display device according to an embodiment of the present disclosure.

An embodiment of the present disclosure provides a three-dimensional display device. As shown in FIG. 1a and FIG. 1b, the device includes:

a display panel 100 including a plurality of first display units 101 and a plurality of second display units 102;

a plurality of light emitting unit groups 200 disposed on one side of the display panel 100; each of the light emitting unit groups 200 includes a plurality of first light emitting units 201 respectively corresponding to the first display units 101, and a plurality of second light emitting units 202 respectively corresponding to the second display units 102; and a control unit configured to control the first light emitting units 201 and the second light emitting units 202 in a light emitting unit group 200 corresponding to a target position 300 to emit lights so that the first light emitting units 201 and the second light emitting units 202 emit lights along a direction pointed to the target position 300.

According to the three-dimensional display device provided by the embodiment of the present disclosure, by providing light emitting unit groups 200 respectively corresponding to target positions 300, the first light emitting units 201 and the second light emitting units 202 in a corresponding light emitting unit group 200 may be controlled to emit lights according to a target position 300, while other light emitting unit groups 200 do not emit light. In this way, it can reduce the power consumption of the three-dimensional display device, save energy and increase the utilization efficiency of luminous energy.

In practical application, the above display panel 100 is preferably a liquid crystal display panel, or may be other display panels, which is not limited herein. Referring to FIGS. 1a and 1b, the plurality of first display units 101 and the plurality of second display units 102 are alternately arranged. During three-dimensional display, image data corresponding to the left eye is input to the first display units 101, and image data corresponding to the right eye is input to the second display units 102 so that the first display units 101 and the second display units 102 display pictures with different angles to form a parallax. When the left and right eyes of a person respectively receive pictures displayed by the first display units 101 and the second display units 102, the brain may superimpose the received pictures and regenerate a picture to generate a stereoscopic effect.

As an example, the above plurality of light emitting unit groups 200 are disposed on one side of the display panel 100, preferably on the light incident side of the display panel 100, that is, the light emitted by each of the light emitting unit groups 200 is directed toward the display panel 100 to provide a backlight source for the display panel 100. As shown in FIG. 1a and FIG. 1b, each of the light emitting unit groups 200 includes a first light emitting unit 201 and a second light emitting unit 202. The first light emitting units 201 correspond to the first display units 101, and the second light emitting units 202 correspond to the second display units 102. For example, in the FIG. 1a and FIG. 1b, the first light emitting units A correspond to the first display units 101, the second light emitting units a correspond to the second display units 102, and the first light emitting units A and the second light emitting units a constitute one light emitting unit group 200. Similarly, the first light emitting units B and the second light emitting units b constitute one light emitting unit group 200; the first light emitting units C and the second light emitting units c constitute one light emitting unit group 200; and the first light emitting units D and the second light emitting units d constitute one light emitting unit group 200. In FIG. 1a and FIG. 1b, for illustration purpose, for example, there are four light emitting unit groups 200, four target positions 300, four first display units 101, four second display units 102, sixteen first light emitting units 201 and sixteen second light emitting unit 202. In actual implementation, the number of the components may be designed according to actual needs, and is not limited herein.

In practical implementations, during three-dimensional display, the control unit may control the first light emitting units 201 and the second light emitting units 202 in the light emitting unit group 200 corresponding to the target position 300 to emit lights according to the target position 300, that is, the control unit may function as a switch, so that the first display units 101 and the second display units 102 may emit light in a direction pointing to the target position 300, and thus, human eyes located at the target position 300 can receive left-eye image displayed by the first display units 101 and the right-eye image displayed by the second display units 102 to form a three-dimensional display image. Referring also to FIG. 1a and FIG. 1b, for illustration purpose, for example, in the figures, there are four target positions 300 including $T_1$, $T_2$, $T_3$ and $T_4$. As shown in FIG. 1a, when the human eye is at the target position $T_1$, the control unit controls the first light emitting units A and the second light emitting units a to emit lights so that the lights emitted by the first display units 101 and the second display units 102 converge at the target position $T_1$, and thus, human eyes located at the target position $T_1$ can receive the left-eye image and the right-eye image displayed by the display panel 100 to form a three-dimensional display effect. In this case, the other first light emitting units 201 and the second light emitting units 202, that is, the first light emitting units BCD and the second light emitting units bcd in FIG. 1a do not emit light. Similarly, as shown in FIG. 1b, when the human eye is at the target position $T_4$, the control unit controls the first light emitting units D and the second light emitting units d to emit lights, and at this time, the first light emitting units ABC and the second light emitting units abc do not emit lights.

Therefore, in the above three-dimensional display device provided by the embodiment of the present disclosure, by providing a plurality of light emitting unit groups 200, determining a light emitting unit group 200 to emit light according to the current target position 300, and controlling the light emitting direction of the first light emitting units 201 and the second light emitting units 202 in the light emitting unit group 200, the lights emitted by the first light emitting units 201 and the second light emitting units 202 are directed to the target position 300. In this way, during three-dimensional displaying, not all the light emitting unit groups 200 are required to emit light, which greatly reduces the power consumption required for display.

Figure 2:
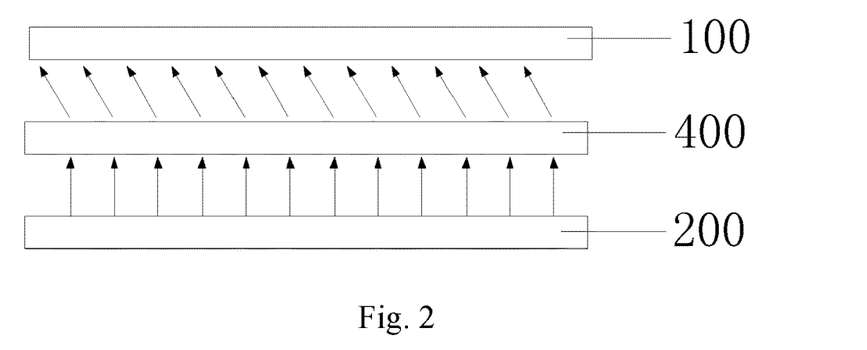
FIG. 2 is a partial schematic diagram of a three-dimensional display device according to an embodiment of the present disclosure.

As an example, in the above three-dimensional display device provided in the embodiment of the present disclosure, as shown in FIG. 2, the above control unit may include a transmission grating 400 disposed on the light emitting side of the light emitting unit group 200.

The transmission grating 400 is configured to change the light emitting directions of the light emitting units.

In the embodiment of the present disclosure, the above transmission grating 400 is configured to change the light emitting directions of the light emitting units. The light emitting units refer to the first light emitting units and the second light emitting units. That is, the transmission grating corresponding to the position of the first light emitting unit may change the light emitting direction of the first light emitting unit, and the transmission grating corresponding to the position of the second light emitting unit may change the light emitting direction of the second light emitting unit. Providing a transmission grating to change the light emitting direction of the light emitting unit is a preferable embodiment of the present disclosure. In practical implementations, other optical structures, such as other diffraction films, may also be employed to change the light emitting direction of the light emitting unit, which is not limited herein.

In order to illustrate the positional relationship between the transmission grating 400, the light emitting unit group 200 and the display panel 100, only part of the transmission grating 400 is shown in FIG. 2. In practical implementations, with reference to FIGS. 1a and 1b, in order that the lights emitted by the first light emitting units 201 and the second light emitting units 202 can pass through the corresponding first display unit 101 and corresponding second display unit 102 and then converge to the same target position 300. Therefore, the first light emitting units 201 and the second light emitting units 202 have different light emitting directions, and thus the grating structures of the transmission gratings 400 at the positions of the first light emitting units 201 and the second light emitting units 202 are slightly different. For example, the grating periods are different, that is, the gaps between strips of the gratings are different. The specific structure of the transmission grating 400 may be set according to actual needs, which is not limited herein. The lights shown in FIG. 2 are only for illustrating that the transmission grating 400 can change the light emitting directions of the light source. In practical application, the light emitted by the light source may also not perpendicular to the light emitting surface, but obliquely toward the transmission grating 400. The light emitting direction of the light source is not limited herein.

It should be noted that, in FIG. 1a and FIG. 1b, in order to clearly illustrate the light emitted by the light emitting unit group 200, in the figures, the light path of the light emitted by the light emitting unit group 200 is indicated by a straight line in the figures. In practical application, the light emitted by the first light emitting unit 201 and passing through the first display unit 101 and the light emitted by the second light emitting unit 202 and passing through the second display unit 102 are inevitably have their angles deflected. In practical implementations, the deflection may also be taken into account in the design of the structure of the above transmission grating 400, to improve the effects of three-dimensional display.

Figure 3A:
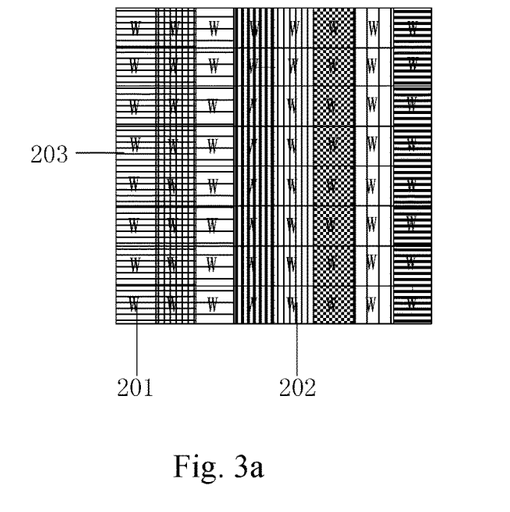
FIG. 3a and FIG. 3b are schematic structural diagrams of a first light emitting unit and a second light emitting unit according to an embodiment of the present disclosure.
Figure 3B:
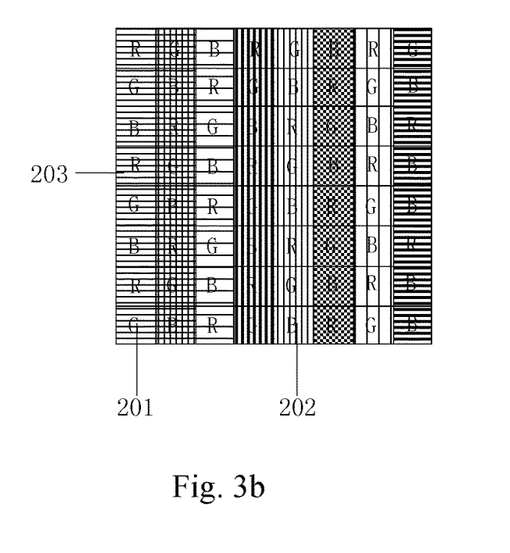

As an example, in the above three-dimensional display device provided by the embodiment of the present disclosure, the first light emitting unit 201 and the second light emitting unit 202 are strip-shaped light sources formed by a plurality of sub-light sources 203. As shown in FIGS. 3a and 3b are schematic structural diagrams of a first light emitting unit 201 and a second light emitting unit 202 corresponding to a first display unit 101 and a second display unit 102.

In practical application, the first display unit 101 and the second display unit 102 are alternately arranged. The first display unit 101 and the second display unit 102 are preferably strip-shaped structures. For example, each of the first display unit 101 and the second display unit 102 are respectively a column of pixels. In order to facilitate providing backlight source for the first display unit 101 and the second display unit 102, the above first light emitting unit 201 and the second light emitting unit 202 are preferably strip-shaped light sources formed by a plurality of sub-light sources 203, and the light emitting unit 201 has the same extension direction as the first display unit 101, and the second light emitting unit 202 has the same extension direction as the second display unit 102.

In practical implementations, the above light source may be an organic light emitting diode (OLED), a light emitting diode (LED), or other light sources. The type of the light source is not limited herein.

Figure 4:
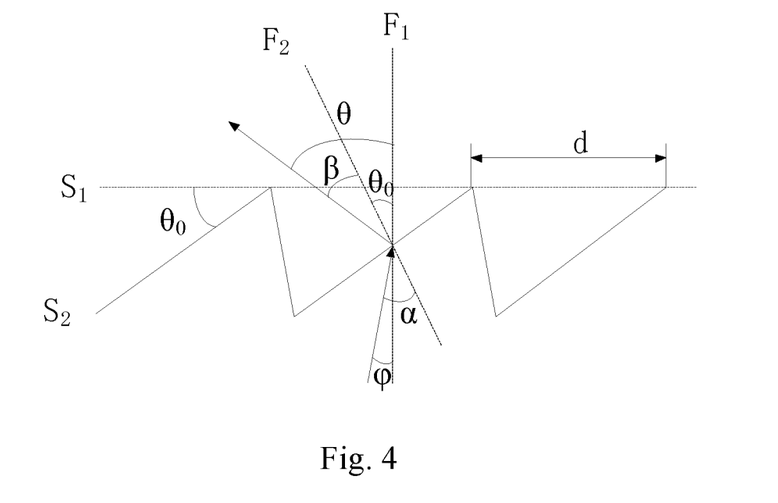
FIG. 4 is a schematic structural diagram of a blazed grating according to an embodiment of the present disclosure.

As an example, in the above three-dimensional display device provided by the embodiment of the present disclosure, as shown in FIG. 4, the transmission grating is a blazed grating.

The blazed grating includes a grating surface $S_1$ and a groove surface $S_2$.

The grating surface $S_1$ is parallel to the light emitting surface of the light source, and the groove surface $S_2$ form an angle with the grating surface $S_1$, which is the blaze angle $\theta_0$.

Referring to FIG. 4, the grating surface $S_1$ is a flat surface parallel to the light emitting surface of the light source. The light emitting surface of the light source may refer to a side surface on the side of the light source which emits light, or may be a surface parallel to the surface of the display panel.

Since the blazed grating only blaze and enhance the light emitted in a specific direction, and energy distributed in other directions is smaller, the blazed grating can change the light emitting direction of the light source. The blazed grating changing the light emitting direction of the light source is related to the blaze angle of the blazed grating, the period of the grating (d in FIG. 4), and the wavelength of the light emitted by the light source. Therefore, the light emitting directions of the sub-light sources in the light source may be determined according to the positional relationship between the target position and the light source. Then, the blaze angle of the blazed grating corresponding to the position of each sub-light source may be determined according to the wavelength of the light emitted from each sub-light source and the grating period of the blazed grating.

In practical implementations, in the above three-dimensional display device provided by the embodiment of the present disclosure, the light source has at least the following two implementations.

First Implementation

Each of the sub-light sources 203 in the light source is a white light source as shown in FIG. 3a.

For the blazed gratings corresponding to the same light source, the blaze angles thereof are the same.

When each of the sub-light sources 203 in the light source is a white light source, in order to achieve color display, a color filter layer is required in the display panel 100. As long as the light emitting unit group 200 emits light in a specific direction to the display panel 100, three-dimensional display effects can be realized. Since the light emitting directions of the sub-light sources 203 in the same light source are the same, the colors of the emitted lights are the same (all are white), and the grating periods of the blazed gratings are the same. Therefore, in the blazed gratings corresponding to the same light source, each blaze angle may be set to the same.

Second Implementation

The light source includes sub-light sources 203 of at least three colors, as shown in FIG. 3b.

For the blazed gratings corresponding to the same light source, the blaze angles of the blazed gratings corresponding to the sub-light sources 203 of the same color are the same.

Figure 3C:
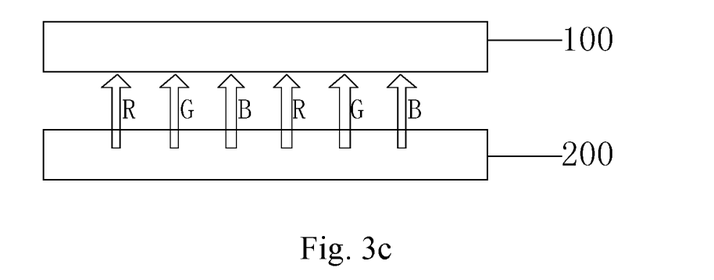
FIG. 3c is a fourth schematic structural diagram of a three-dimensional display device according to an embodiment of the present disclosure.

Referring to FIG. 3c, when the above light source includes sub-light sources 203 of at least three colors, that is, the light emitted from the light source is colored. In this case, the color filter layer may be omitted from the display panel 100, and after the colorful lights emitted from the light emitting unit group 200 pass through the display panel 100, color display effects may be realized. Since the light emitting directions of the sub-light sources 203 in the same light source are the same and the grating periods of the blazed gratings are the same while the wavelengths of the lights emitted from the sub-light sources 203 of different colors are different, the blaze angles of the blazed gratings corresponding to the sub-light sources 203 of different colors are different, and the blaze angles of the blazed gratings corresponding to the sub-light sources 203 of the same color may be set to the same.

The arrows in FIG. 3c are only for illustrating that the lights emitted from the light emitting unit groups 200 are three primary colors of red, green and blue, and do not represent the light emitting directions of the light emitting units. The directions of light emitted by the light emitting unit groups 200 are not limited herein.

In the first implementation and the second implementation, as an example, the grating period of the blazed grating at each position is the same. In practical implementations, the light emitting direction of the light source may also be changed by changing the grating period.

In FIG. 3b and FIG. 3c, each of the light sources includes sub-light sources 203 of three colors of red (R), green (G) and blue (G) as an example for illustration. In practical implementations, the light source may be composed of sub-light sources 203 of other colors. For example, the light source may include sub-light sources 203 of four colors of (R), green (G), blue (G) and yellow (Y). The specific colors of the sub-light sources 203 included in the light source are not limited.

As an example, in the above-mentioned three-dimensional display device provided by the embodiment of the present disclosure, for the blazed gratings corresponding to the same light source, the larger the wavelength of the light emitted from sub-light source 203, the smaller the blaze angle of the blazed grating corresponding to the sub-light source 203 will be.

When the light emitting directions are the same and the grating periods are the same, the blaze angle is inversely proportional to the wavelength of the light emitted from the sub-light source 203. Therefore, for the blazed gratings corresponding to the same light source, the larger the wavelength of the light emitted from sub-light source 203, the smaller the blaze angle of the blazed grating corresponding to the sub-light source 203 will be.

As an example, in the above three-dimensional display device provided by the embodiment of the present disclosure, the wavelength of the emitted light of the sub-light source and the blaze angle may satisfy the following relationship:

$$m\lambda = 2d \cdot \sin \alpha \cdot \cos \theta_0$$

Where $\lambda$ represents the wavelength of the light emitted by the sub-light source, d represents the grating period of the blazed grating, $\alpha$ represents the angle between the emitted light of the sub-light source and the normal of the groove surface, $\theta_0$ represents the blaze angle, and m represents a natural number.

As shown in FIG. 4, the blazed grating is formed by a grating surface $S_1$ and a groove surface $S_2$. An angle between the grating surface $S_1$ and the groove surface $S_2$ is a blaze angle (or a groove angle) $\theta_0$. In the figure, $F_1$ is a normal of the grating surface, $F_2$ is the normal of the groove surface, an angle between the incident light to the blazed grating and the normal $F_1$ of the grating surface is $\varphi$, an angle between the incident light and the normal $F_2$ of the groove surface is $\alpha$, an angle between the emitted light (that is, the diffracted light obtained by the incident light passing through the blazed grating) and the normal $F_1$ of the grating surface is $\theta$, and an angle between the emitted light and the normal $F_2$ of the groove surface is $\beta$. Since the blazed grating is a transmission grating, the incident light and the emitted light are on the same side of the normal $F_1$ of the grating surface, to obtain a grating equation of the blazed grating as $d \cdot (\sin \theta + \sin \varphi) = m\lambda$, where d represents the grating period, as shown in FIG. 4. The grating period d is the distance between two adjacent blazing angles, $\lambda$ represents the wavelength of incident light. As can be seen from the optical path in FIG. 4, $\alpha = \theta_0 + \varphi_{100}$, $\beta = \theta - \theta_0$. Since the light emitting direction of the emitted light is the main maximum central direction of the diffracted light, then $\alpha = \beta$, and thus:

$$\theta = \theta_0 + \beta = \theta_0 + \theta_0 + \Phi = 2\theta_0 + \alpha - \theta_0 = \theta_0 + \alpha$$

Since $\Phi = \alpha - \theta_0$, which is derived from $m\lambda = 2d \cdot \sin \alpha \cdot \cos \theta_0$, and if the emitted light is primary main maximum, then m is 1. Since the incident lights are the light emitted by the light emitting unit groups, and the incident light may be set as monochromatic light such as white light or RGB as desired, the wavelength $\lambda$ of the incident light is known, then according to the positional relationship between the target position and the display panel, the angle $\beta$ between the emitted light and the normal $F_2$ of the groove surface may be obtained, and it can be determined that the grating period d is generally in the range of 1/1200 mm to 1/600 mm. Therefore, it is possible to calculate the blaze angle $\theta_0$. In this way, the display panel can emit light pointing to the target position by setting the grating period and the size of the blaze angle according to the angle of the emitted light required by the target position and the color required to be displayed.

In practice applications, in the above three-dimensional display device provided in the embodiments of the present disclosure, the number of pixel columns corresponding to the first display unit is the same as the number of pixel columns corresponding to the second display unit. In this way, during three-dimensional displaying, the left eye image displayed by the first display unit received by the human eye and the right eye image displayed by the second display unit may have the same size, and the three-dimensional image synthesized by the brain may have a better display effect. As an example, the above first display unit and the second display unit respectively correspond to at least one column of pixels. If the display resolution requirement is not high, the first display unit and the second display unit may also correspond to more columns of pixels, for example, correspond to two columns of pixels or three columns of pixels, respectively.

Further, in the above three-dimensional display device provided in the embodiment of the present disclosure, the device may further include a human-eye positioning unit.

The human-eye positioning unit is configured to determine the position of the human eyes, determine the position of the human eyes as the target position, and send the position information of the target position to the control unit.

By providing the eye-positioning unit, the position of the human eyes can be accurately determined. During three-dimensional displaying, the light sources in the corresponding light emitting unit group can be turned on in real time according to the change of the position of the human eyes so that the emitted light of the display panel is emitted in a direction pointing to the position of the human eyes. It can ensure the three-dimensional display, and additionally, reduce the power consumption of the three-dimensional display device.

In practical implementations, the above human-eye positioning unit may be disposed on the display panel, or may be disposed on the light emitting unit group or the control unit. The position of the human-eye positioning unit is not limited herein.

It should be noted that the above three-dimensional display device provided in the embodiments of the present disclosure may be applied to any product or component having a display function, such as a mobile phone, a tablet, a television, a display, a notebook computer, a digital photo frame, a navigator and the like.

Based on the same inventive concept, an embodiment of the present disclosure further provides a display method of the above three-dimensional display device. Since the principle of solving the problem by the display method is similar to that of the three-dimensional display device, the implementation of the display method may refer to the implementation of the three-dimensional display device described above, and details are not repeatedly described herein.

Figure 5:
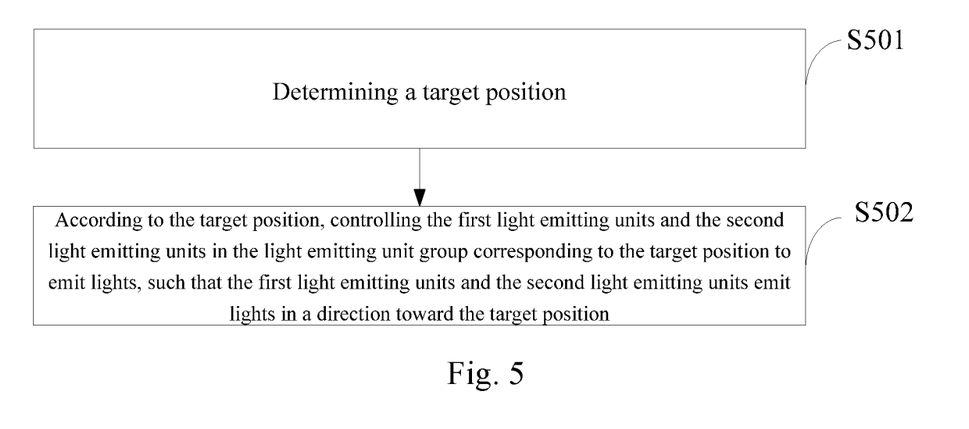
FIG. 5 is a flowchart of a display method of the above three-dimensional display device according to an embodiment of the present disclosure; and In the figures, 100 denotes a display panel; 101 denotes a first display unit; 102 denotes a second display unit; 200 denotes a light emitting unit group; 201 denotes a first light emitting unit; 202 denotes a second light emitting unit; 203 denotes a sub-light source; 300 denotes a target position; and 400 denotes a transmission grating.

As shown in FIG. 5, the display method of the three-dimensional display device provided by the embodiment of the present disclosure includes the following steps.

In S501, a target position is determined.

In S502, according to the target position, the first light emitting units and the second light emitting units in the light emitting unit group corresponding to the target position are controlled to emit lights so that the first light emitting units and the second light emitting units emit lights in a direction toward the target position.

In the above display method provided by the embodiments of the present disclosure, before the three-dimensional display, the target position is determined first, and then the light source in the corresponding light emitting unit group is controlled to emit lights according to the target position, so as to realize the three-dimensional display. In this way, during the display, not all the light sources are required to be turned on, which greatly reduces the power consumption of the three-dimensional display device.

Further, in the above display method provided in the embodiments of the present disclosure, the above first light emitting unit and the second light emitting unit are strip-shaped light sources formed by a plurality of sub-light sources.

The above step S502 may include the following step.

According to the target position, the light sources in the light emitting unit group corresponding to the target position are turned on.

By turning on the light sources in the light emitting unit group corresponding to the target position, the light emitting unit groups can be conveniently controlled.

In practical implementations, in the above step S01, during three-dimensional displaying, the position of human eyes may be taken as the target position. The position of human eyes may be determined by providing a human-eye positioning unit and the position information of the human eyes may be sent to the control unit.

According to the three-dimensional display device and the display method thereof provided by the embodiments of the present disclosure, by providing light emitting unit groups respectively corresponding to target positions, the first light emitting units and the second light emitting units in a corresponding light emitting unit group may be controlled to emit lights according to the target position, while other light emitting unit groups do not emit light. In this way, it can reduce the power consumption of the three-dimensional display device, save energy and increase the utilization efficiency of luminous energy.

Apparently, those skilled in the art can make various modifications and variations to the present disclosure without departing from the spirit and scope of the present disclosure. In this way, if these modifications and variations of the present disclosure fall within the scope of the claims of the present disclosure and its equivalent technologies, the present disclosure is also intended to include such modifications and variations.

What is claimed is:

1. A three-dimensional display device, comprising:
   a display panel comprising a plurality of first display units and a plurality of second display units;
   a plurality of light emitting unit groups, disposed on one side of the display panel; wherein each of the light emitting unit groups comprises a plurality of first light emitting units respectively corresponding to the first display units, and a plurality of second light emitting units respectively corresponding to the second display units;
   wherein any one of the plurality of first light emitting units respectively corresponding to each of the first display units corresponds to one of the plurality of second light emitting units respectively corresponding to each of the second display units, such that the same first light emitting units respectively corresponding to the first display units and the corresponding same second light emitting units respectively corresponding to the second display units form one of the light emitting unit groups; and
   a control unit configured to control the first light emitting units and the second light emitting units in the one light emitting unit group corresponding to a target position to emit lights so that the first light emitting units and the second light emitting units emit lights along a direction pointed to the target position, and other first light emitting units and the second light emitting units in the one light emitting unit group do not emit light,
   wherein the control unit comprises a transmission grating disposed on a light emitting side of the light emitting unit group, and the transmission grating is configured to change the light emitting directions of the light emitting units,
   the first light emitting unit and the second light emitting unit are strip-shaped light sources formed by a plurality of sub-light sources,
   the transmission grating is a blazed grating, the blazed grating comprising a grating surface and a groove surface, wherein the grating surface is parallel to the light emitting surface of the light source, the groove surface forms an angle with the grating surface, and the angle is a blaze angle,
   for the blazed gratings corresponding to the same light source, the larger the wavelength of the light emitted from sub-light source, the smaller is the blaze angle of the blazed grating corresponding to the sub-light source, and the wavelength of the emitted light of the sub-light source and the blaze angle satisfy the relationship:

$$m\lambda = 2d \cdot \sin \alpha \cdot \cos \theta_0$$

where $\lambda$ represents the wavelength of the light emitted by the sub-light source, d represents the grating period of the blazed grating, $\alpha$ represents the angle between the emitted light of the sub-light source and the normal of the groove surface, $\theta_0$ represents the blaze angle, and m is a natural number.

2. The three-dimensional display device according to claim 1, wherein each of the sub-light sources in the light source is a white light source; and
   for the blazed gratings corresponding to the same light source, the blaze angles are the same.

3. The three-dimensional display device according to claim 1, wherein the light source comprises sub-light sources of at least three colors;
   for the blazed gratings corresponding to the same light source, the blaze angles of the blazed gratings corresponding to the sub-light sources of the same color are the same.

4. The three-dimensional display device according to claim 1, wherein a number of pixel columns corresponding to the first display unit is the same as a number of pixel columns corresponding to the second display unit.

5. The three-dimensional display device according to claim 1, further comprising: a human-eye positioning unit;
   wherein the human-eye positioning unit is configured to determine a position of human eyes, to determine the position of the human eyes as the target position, and to send the position information of the target position to the control unit.

6. A display method of a three-dimensional display device, wherein the three-dimensional display device comprises: a display panel comprising a plurality of first display units and a plurality of second display units; a plurality of light emitting unit groups, disposed on one side of the display panel; wherein each of the light emitting unit groups comprises a plurality of first light emitting units respectively corresponding to the first display units, and a plurality of second light emitting units respectively corresponding to the second display units; wherein any one of the plurality of first light emitting units respectively corresponding to each of the first display units corresponds to one of the plurality of second light emitting units respectively corresponding to each of the second display units, such that the same first light emitting units respectively corresponding to the first display units and the corresponding same second light emitting units respectively corresponding to the second display units form one of the light emitting unit groups, and a control unit configured to control the first light emitting units and the second light emitting units in the one light emitting unit group corresponding to a target position to emit lights so that the first light emitting units and the second light emitting units emit lights along a direction pointed to the target position, and other first light emitting units and the second light emitting units in the one light emitting unit group do not emit light, wherein the control unit comprises a transmission grating disposed on a light emitting side of the light emitting unit group; and the transmission grating is configured to change the light emitting directions of the light emitting units, the first light emitting unit and the second light emitting unit are strip-shaped light sources formed by a plurality of sub-light sources, the transmission grating is a blazed grating, the blazed grating comprising a grating surface and a groove surface, wherein the grating surface is parallel to the light emitting surface of the light source, the groove surface forms an angle with the grating surface, and the angle is a blaze angle, for the blazed gratings corresponding to the same light source, the larger the wavelength of the light emitted from sub-light source, the smaller is the blaze angle of the blazed grating corresponding to the sub-light source, and the wavelength of the emitted light of the sub-light source and the blaze angle satisfy the relationship: $m\lambda = 2d \cdot \sin \alpha \cdot \cos \theta_0$, where $\lambda$ represents the wavelength of the light emitted by the sub-light source, d represents the grating period of the blazed grating, $\alpha$ represents the angle between the emitted light of the sub-light source and the normal of the groove surface, $\theta_0$ represents the blaze angle, and m is a natural number, and the method comprises:

determining a target position; and according to the target position, controlling the first light emitting units and the second light emitting units in the light emitting unit group corresponding to the target position to emit lights so that the first light emitting units and the second light emitting units emit lights in a direction toward the target position.

7. The display method according to claim 6, wherein according to the target position, controlling the first light emitting units and the second light emitting units in the light emitting unit group corresponding to the target position to emit lights comprises: according to the target position, turning on the light sources in the light emitting unit group corresponding to the target position.

* * * * *